Oct. 18, 1927.
H. O. KRUEGER
AUTOMATIC TRACTOR HITCH
1,646,253
Filed May 5, 1926
3 Sheets-Sheet 2
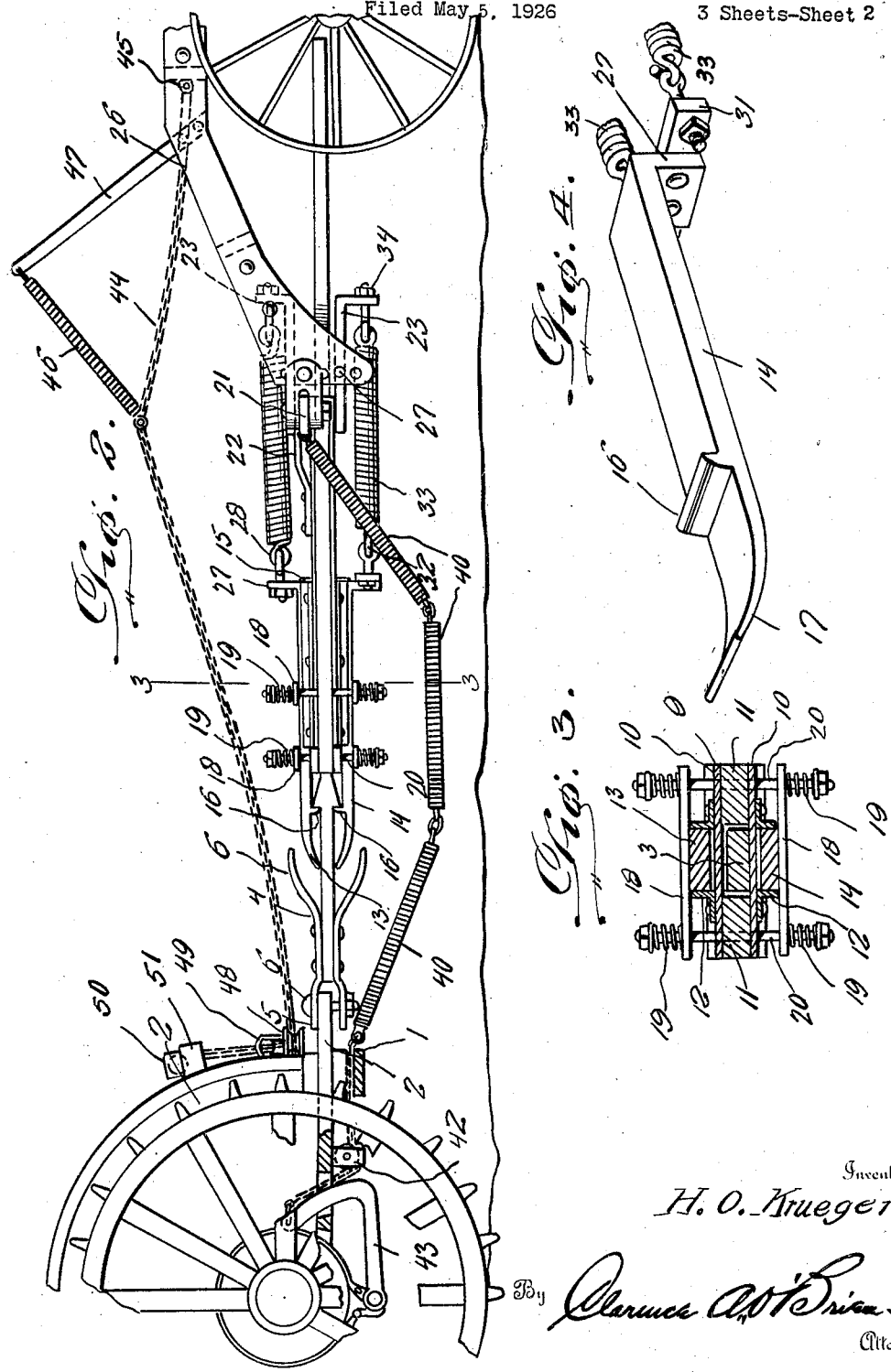
Inventor
H. O. Krueger,
By Clarence A. O'Brien
Attorney

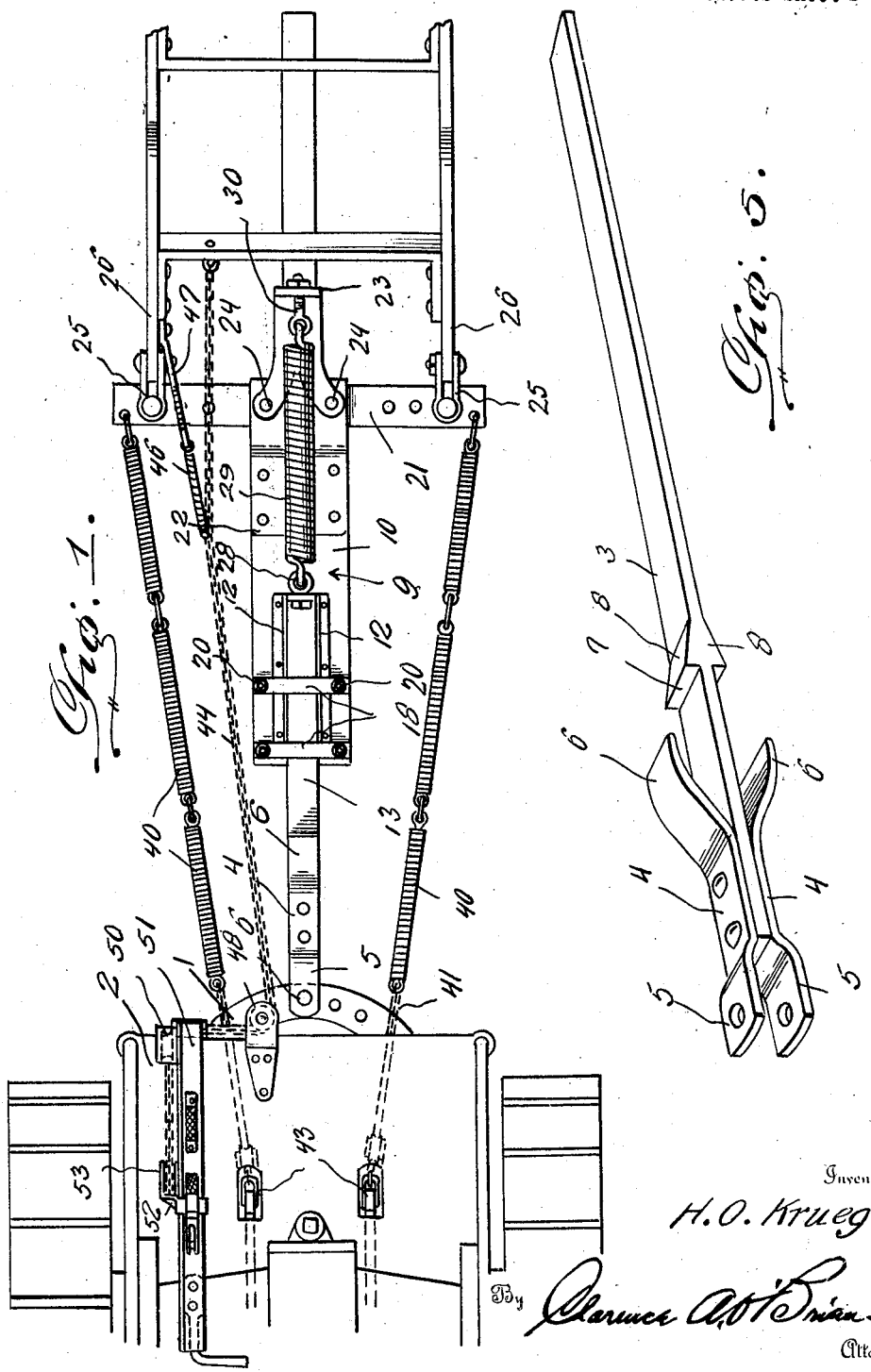

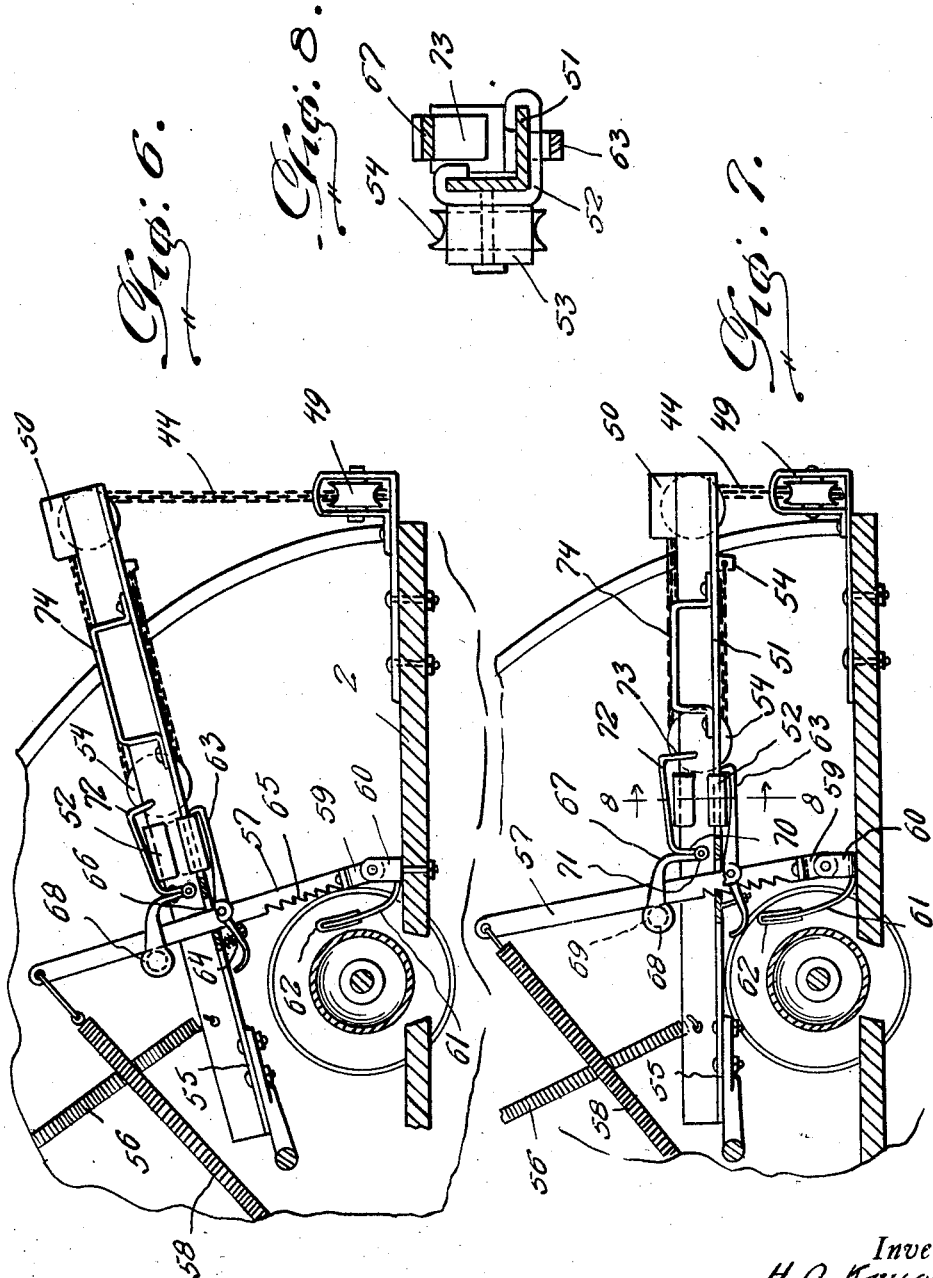

Patented Oct. 18, 1927.

1,646,253

UNITED STATES PATENT OFFICE.

HERMANN OTTO KRUEGER, OF NILES TOWNSHIP, FLOYD COUNTY, IOWA.

AUTOMATIC TRACTOR HITCH.

Application filed May 5, 1926. Serial No. 106,384.

This invention relates to improvements in automatic tractor hitches, particularly adapted for releasing the tractor from connection with a plow or other towed apparatus, in the event said apparatus strikes an obstruction during the operation thereof.

An object of the invention resides in providing an automatic tractor hitch in which a draw bar is provided for connection with the tractor having means thereon for cooperation with suitable means carried by the towed apparatus to retain the draw bar in connection therewith in the normal operation of the towed apparatus and under an abnormal strain or pull thereon, to be operated as a result of such abnormal pull and automatically release the draw bar to disconnect the tractor from the towed apparatus.

Another object of the invention resides in providing an automatically hitching device for tractors, plows or other apparatus to be towed, wherein the device is provided with a draw bar adapted for attachment to the tractor which will automatically engage in suitable mechanism carried by a housing secured to the towed apparatus so that the draw bar will be automatically locked against movement in said apparatus, to permit the towing of the plow or other machine by the tractor, and which will be operated upon the application of an excessive tension on the draw bar due to the plow or other towed machine striking an obstruction to operate suitable resilient means for releasing the mechanism carried by the towed machine from connection wth the draw bar, to permit the release of the towed machine from the tractor.

The invention comprehends numerous other objects and improvements in the details of construction and relation of the parts which are more particularly pointed out in the following detailed description and in the claims directed to a preferred form of the invention, it being understood however, that various changes may be made in the size, shape and arrangement of the parts for carrying out the invention, without departing from the spirit or scope thereof as herein set forth.

In the drawings forming part of this application:

Figure 1 is a plan view of the improved automatic tractor hitch applied to a plow construction, and connected with the tractor draw bar.

Fig. 2 is a side elevation thereof as illustrated in Fig. 1.

Fig. 3 is a vertical transverse sectional view taken on the line 3—3 of Fig. 2.

Fig. 4 is an enlarged perspective of one of the slide members.

Fig. 5 is an enlarged perspective of the draw bar of the tractor hitch.

Fig. 6 is an enlarged detail vertical sectional view through the rear end portion of the tractor, showing the improved clutch controlling mechanism operably connected to the clutch with the parts in the engaged position of the clutch.

Fig. 7 is a view similar to Fig. 6 with the parts operated and positioned in the released or disengaged position of the clutch.

Fig. 8 is a transverse section taken on the line 8—8 of Fig. 7.

1 indicates the draw bar of a tractor, the rear end of which is shown at 2 and to which is secured a draw bar 3 of the automatic hitch type. The end of the draw bar attached to the tractor draw bar is provided with a pair of plates 4, which have the ends separated to provide a pair of ears 5 on the end of the draw bar adapted to fit over the opposite sides of the draw bar 1 of the tractor for receiving a securing pin 6 extending through an opening in the draw bar 1, and in the ears 5 for pivotally mounting the draw bar 3 to the draw bar of the tractor.

These plates are suitably riveted to the end of the draw bar 3, while the rear ends thereof are curved upwardly as indicated at 6 to form a stop mechanism, the purpose of which will be presently pointed out. The draw bar 3 of the hitch is provided at 7 with a pair of shoulders projecting from the upper and lower sides of the draw bar and having inclined faces 8 as clearly illustrated in Fig. 5, the purpose of which will be presently pointed out.

The rear end of the draw bar 3 of the tractor hitch slidably extends through a casing 9 formed by the upper and lower plates 10 and the bar 11, which are all suitably secured together to form a housing such as by welding or the like.

The forward end of this housing 9 has angle bars 12 secured thereto and arranged in opposed pairs on the upper and lower faces thereof to form guideways for slide members 13, and 14, forming upper and lower slides respectively. At the rear ends of the guideways formed by these angle bars 12, are secured suitable stop projections 15 for limiting the rearward movement of the slides 13 and 14 respectively. These slide members 13 and 14 are provided with pawls 16 projecting from one face thereof and adapted to normally ride on the opposite faces of the draw bar 3 of the hitch, and for cooperation with the shoulders 7 for locking the draw bar in connection with the housing as will be explained.

The forward ends of these slide members 13 and 14 are curved toward the draw bar 3 as indicated at 17 and are adapted for engagement with the outwardly curved ends 6 of the plate members 4 for forming a stop to limit the backward movement of the draw bar to the housing.

Plate members 18 are mounted on the top and bottom portions of the guides 13 and 14 respectively as illustrated in Figs. 2 and 3 and positioned transversely of the housing 9 for engagement with the slide members to retain the same in the guideways and in contact with the housing, which plate members are arranged in pairs and forced toward the housing by the springs 19 carried by the bolts 20 mounted in and extending through the housing in the side portions thereof as clearly illustrated in Fig. 3 for supporting the springs operating the bars 18 which are in alined relation at the upper and lower sides of the housing. This mounting for these slide members also permits of a relative movement with respect to the housing so that the latches 16 may be released from the shoulders 7 in a manner as will be hereinafter pointed out.

On the rear end of the housing is mounted a transverse supporting bar member 21 having one side lying against the rear end of the housing 9, while a plate member 22 secured to the housing overlies the other side of the supporting bar member 21. To the lower side of the housing and the upper side of the plate member 22 are positioned spring anchoring brackets 23, while suitable securing means such as bolts or the like 24 extend through all of these parts and rigidly secure the same in assembled relation. The free ends of the supporting bar 21 are provided with a plurality of perforations for receiving the attaching clevises 25 having adjustable connection therewith which are attached to the forward ends of the arms 26 of a plowing machine or the like, as clearly illustrated in Figs. 1 and 2. As particularly shown in Fig. 2, this connection of the clevises 25 with the arms 26 is usually of an adjustable character, as indicated at 27, showing a plurality of holes in the forward ends of these arms 26.

The rear ends of the slide members 13 and 14 respectively are provided with laterally disposed ears 27 the ear of the member 13 receiving a connection 28 anchoring one end of a coil spring 29 to the slide member while the opposite end of the coil spring is adjustably connected to the spring bracket 23, secured to the rear end of the housing 9 as indicated at 30 in Fig. 1. This spring is normally held under a substantial tension for a purpose to be presently described.

The lower slide member 14 has a plate member 31 secured thereto in order to receive the anchoring bolts 32 for anchoring a pair of springs 33 at one end to the lower slide member. The opposite ends of these springs are anchored by suitable members indicated at 34 to the lower rear spring brackets 23.

With the automatic hitch construction above described, the rearward movement of the tractor toward the plow machine will move the draw bar 3 through the housing 9 so that the latches 16 will ride upwardly on the inclined spaces 8 and drop in front of the shoulders 7 on said draw bar. The backward movement of the tractor relative to the plow machine will be limited by the outwardly curved ends of the plate members 4. In the forward movement of the tractor after this backward movement, the latches 16 in engaging the holders 7 will provide a drawing connection and a hitch between the tractor and the plow machine.

The springs 29 and 33 are substantially heavy tension springs and serve to transmit the pulling power from the tractor through the slide members 13 and 14 and the bar member 21 to the plow machine for the usual operation thereof. If the plows, in their normal operation in plowing soil, strike an obstruction such as a rock, root, or the like, which would injure the machine by the further impelling of the same, a substantially great tension is applied to the springs 29 and 33 due to the arresting of the forward movement of the plow machine and continued movement of the tractor will move the slides 13 and 14 forwardly relative to the housing 9.

As the tension of the springs 29, and 33 is increased in the forward movement of the tractor relative to the plow machine the tendency of these springs is to operate the slide members on the rear ends as a fulcrum which are engaged with the housing, until the force is sufficient to move the free ends of said slide members outwardly from the opposite sides of the draw bars 3 for releasing the latches 16 from the shoulders 7 on the draw bar. The plate members 18 being normally projected by the springs 19 toward the slide members 13 and 14 normally retain said slide members in engagement with the opposite faces of the casing and oppose a separating movement thereof in the normal operation of the heads to prevent the tractor from becoming disconnected or unhitched from a plow or the like. When the load or pull becomes abnormal, the tension applied to springs 29 and 33, tending to produce a pivotal movement of the slide members to separate the ends for releasing the draw bar is sufficient to overcome the tension of the springs and thereby move the plates outwardly to effect such release of said draw bars. The plates however, form a stop to prevent disengagement of the slide members from the casing in the guideways provided for said members. This automatically releases the hitch between the tractor and the plow machine so that the further movement of the tractor forwardly, will not provide an undue tension on the plow machine with the consequent damage of the working parts thereof due to excessive strain.

The operator of the tractor can then stop the motion of the tractor by the mechanism suitably provided therefor and after removing the obstruction or operating the plow machine to clear the same, the tractor is again backed toward the plow. The hitch will again automatically operate in backing the tractor so that the latches 16 will engage in front of the shoulders 7 on the draw bar 3 in the manner as shown in the drawings and above described. Upon the forward operation of the tractor, the plow machine will be again operated in the manner as above described, until the striking of a further obstruction, which will again permit the automatic release of the towing mechanism.

This automatic unhitching mechanism provides for the automatic control of the tractor relative to the towed vehicle through the provision of connection for operating the clutch and brake pedals of the tractor in order to release the clutch and apply the brakes on the tractor immediately following the release of the hitching mechanism when the towed vehicle strikes a rock or other obstruction.

For the purpose of controlling the brakes of the tractor, a plurality of interlinked springs 40 are provided as clearly illustrated in Fig. 1, one end of each pair of such springs having the ends suitably connected to the ends of the bar member 21, while the opposite ends receive chain constructions 41 which extend over the tractor draw bar 1 and through the guide pulleys 42 mounted on the bottom of the platform 2 of the tractor, having the free ends secured by suitable lengths to the upper ends of the brake levers 43 of the tractor as clearly shown in Fig. 2.

In the position of the parts as shown in Fig. 2, the brakes are in the released position from which it will be readily understood that, upon release of the hitching mechanism, above described automatically through the striking of an obstruction by the towed vehicle, the springs 40 connected with the bar 21 will effect the necessary pull on the brake levers 43 and move the same downwardly through the platform 2 of the tractor and apply the brakes, the springs 40 having such resiliency as to permit the further movement of the tractor until it has been stopped by the operation of the brakes.

Cooperating with the brake operating means above described is a suitable clutch releasing mechanism including the operating cable or chain 44 which is anchored to the towed vehicle at 45 and suitably supported by the coiled spring 46 mounted on the arm 47 carried by the towed vehicle 26. This chain 44 extends over the guide roller 48 mounted on the rear edge of the platform 2 of the tractor and a second similar guide roller 49 also suitably mounted on the rear edge of the platform 2. This operating chain 44 for the clutch then extends upwardly and is passed through the pulley structure 50 mounted on the rear end of the clutch operating member 51 which slidably mounts the slide member 52 formed with the housing 53 rotatably carrying the slack pulley 54 through which the chain 44 is passed and the end portion anchored to the operating bar 51 as indicated at 54 adjacent the rear end thereof. This clutch operating lever 51 at its forward end is bolted to the clutch lever of the tractor as indicated at 55, as clearly shown in Figs. 6 and 7.

A coiled spring 56 is anchored to the clutch operating lever 51 and a suitable portion of the tractor frame above said lever so as to normally raise the lever to engage the clutch for driving the tractor.

Referring particularly to Figs. 6 and 7, a ratchet lever 57 normally operated in one direction by the coiled spring 58 anchored to the upper end of the lever and forwardly at its opposite end to the tractor, while the lower end of the lever is provided with a forked end 59 pivotally mounted in the U-shaped bracket 60 suitably anchored to the platform 2 of the tractor. This U-shaped bracket 60 has a lateral projection 61 thereon which is curved upwardly and provided with the wear guard 62 which forms an operating member for the pawl 63 pivotally mounted on the lower face of the operating lever 51. This pawl 63 is normally adapted to have the end thereof engaged with the edge portion of the slide member 53 as clearly shown in Fig. 6 for retaining it in the position shown in Fig. 6 in order to provide a substantial bight in the chain 44 for a purpose which will presently appear.

A suitable coiled spring 64 is interposed between the free end of the pawl 63 and the bar member 51 for normally holding the pawl in operative position. The free end of this pawl lies in the path of the operating member 62 so that when the clutch lever is depressed, the operating member 62 will engage the free end of this pawl, rocking the same on its pivot, and release the slide member 52 in order to permit a slack in the chain 44. The ratchet member 57 is provided with a plurality of teeth at 65 with which this ratchet member extending through an opening 66 in the bar 51 engages the bar 51 so that in the depressed position of this clutch operating member the teeth 65 will cooperate with the edge of the opening 66 in the manner as shown in Fig. 7 to hold the clutch in disengaged relation.

When the towed vehicle strikes an obstruction and operates the automatic hitch for releasing the tractor therefrom, it will be seen that the tractor moves forward under its power until the chain 44 operates on the operating member 51 to move it from the position as shown in Fig. 6, downwardly, to the position shown in Fig. 7 which will release the clutch and immediately upon its release and immediately upon the further movement downward from the position of Fig. 7, the operating member 62 will engage the pawl 63 and release the slide member 52. When this operation is completed the coiled springs 40 and the chain 41 will have operated the brakes to stop the tractor and the release of the slide member 52 will permit the chain 44 to slacken by releasing the bight therein thru the movement of the slide member on the operating member 51 toward the pulley 50.

The operating member 51 will be retained in the depressed position in the manner as illustrated in Fig. 7 holding the clutch of the tractor released. The slack in the chain 44 permits the upward movement of the lever and for releasing the same, a suitable releasing member is provided at 67 which is formed with a bifurcated end 68 carrying a roller 69 shown in dotted lines in Figs. 6 and 7 while the central portion of the lever is formed with a laterally extending looped end 70 to provide a pivot for the releasing member at 71 which receives a bolt suitably pivotally mounting it on the operating member 51.

The opposite end of this releasing member 67 is extended rearwardly of the tractor as at 72 and provided with a depending end 73 which forms a foot receiving portion so that the operator of the tractor may place his foot upon the portion 72 and upon depressing it, the depending end 73 will limit the downward movement while the rollers 69 engaging the ratchet member 57 which extends through the bifurcated end 68 will cause the same to be moved against the tension of the spring 58 and release the teeth 65 from engagement with the operating member 51 as shown in Fig. 7.

The handle 74 placed on the operating lever 51 provides a suitable heel rest or hand grip and after the release of the ratchet member 57 from the operating member 51, the spring 56 will raise the clutch operating lever 51 from the position of Fig. 7 to that shown in Fig. 6 so that the clutch may be again engaged for driving the tractor. Previous to the re-engagement of this clutch, the gear shift mechanism of the tractor will be placed in the "reverse" position, so that upon engagement with the clutch, the tractor will be backed toward the towed vehicle for automatically re-connecting the hitch, but the vehicle may be towed forwardly after the plows or other implements which may have engaged an obstruction have been released therefrom and the operation of the tractor and the towed vehicle continued in the usual manner until another objection is encountered, when the operation would be repeated.

From this description, it will thus be appreciated that a full automatic control for a tractor and by a towed vehicle is provided including an automatic hitch, clutch operating means and brake operating means, in which the parts effectively cooperate to prevent damage to the hitch operating and control mechanism, the tractor, or towed vehicle.

Having thus described my invention, what I claim as new is:—

1. An automatic tractor hitch comprising a draw bar for removable attachment to a tractor, a guide member for said draw bar removably connected to a machine to be towed, means on said guide members for detachable engagement with said draw bar, said means being normally operated to engage said draw bar, and resilient means tensioned by the pull applied to said draw bar for detaching the first mentioned means from engagement with said draw bar upon an abnormal pull being applied to the draw bar.

2. An automatic tractor hitch, comprising a casing, means for attaching the casing to a machine to be towed, a draw bar slidable in said casing adapted for attachment to a towing machine, slidable means on said housing adapted for detachable engagement with the draw bar, means for holding said last mentioned means engaged with the draw bar, and resilient means tensioned by an abnormal pull on said head for disengaging said slidable means from said draw bar against the tension of the last mentioned means.

3. An automatic tractor hitch comprising a draw bar adapted for attachment to a tractor, a guide member adapted for removable attachment to a machine to be towed, slide members mounted for sliding and limited pivotal movement on said guide member, means for normally retaining said slide members in engagement with said draw bar for detachable connection therewith, and resilient means adapted for transmitting the power from said draw bar to said guide member and provide a resilient towing connection between the towing and towed machines, said last mentioned resilient means being adapted to operate said slide members upon an abnormal pull being exerted on said hitch by said towed machine, for disengaging the slide member from connection with the draw bar.

4. Means for automatically controlling a tractor, and a towed vehicle, comprising an automatic hitching means, means for operating the brakes of the tractor by the towed vehicle, and means for operating the clutch mechanism of the tractor by the towed vehicle, said means cooperating in a predetermined manner.

5. In combination, a tractor having a clutch mechanism and a brake mechanism, a towed vehicle, means for automatically towing and releasing said towed vehicle from the tractor, and means controlled by the towed vehicle for operating the clutch and brake mechanism of the tractor upon the automatic release of the towing means.

6. An automatic tractor hitch, comprising a draw bar for removable attachment to a tractor, a guide member for said draw bar removably connected with a machine to be towed, means on the guide member adapted for detachable engagement with said draw bar, means normally operating the first mentioned means to detachably engage said draw bar, and resilient means for operating the first mentioned means to release the draw bar under an abnormal pull thereon, said second-mentioned means being operable by the draw bar to permit re-engagement of the draw bar with the first mentioned means after each releasing operation.

7. In combination, a tractor, a towed vehicle, a hitch for connecting the tractor to the towed vehicle, means operated by an abnormal pull on the hitch for disengaging the connection of the hitch between the tractor and the towed vehicle, said means having connection for releasing the clutch mechanism of the tractor, and means automatically operated upon a rear movement of the tractor for re-engaging the hitch and restoring the connection between the tractor and the towed vehicle.

8. In combination, a tractor having a clutch mechanism, a towed vehicle, means for automatically towing and releasing said towed vehicle from the tractor, and means operated by the last named means for operating the clutch mechanism with said tractor.

9. An automatic tractor hitch, comprising a pair of associated elements, one of said elements being adapted for mounting on a tractor, and the other element adapted for attachment to a towed vehicle, means carried by one element adapted for detachable engagement with the other element to detachably connect said element, and resilient means for operating the last named means to release said element from connection when an abnormal pull is applied to said hitch, said last named means further permitting operation of the first mentioned means upon a rearward movement of the tractor toward a towed vehicle to reconnect said element for subsequent towing operation through the hitch.

In testimony whereof I affix my signature.

HERMANN OTTO KRUEGER.